3,560,263
ELECTROLYSIS
Dominicus A. J. Swinkels, Indianapolis, Ind., assignor to
General Motors Corporation, Detroit, Mich.
No Drawing. Filed Oct. 5, 1966, Ser. No. 584,341
Int. Cl. H01m 27/00; C22d 3/06; B01k 3/00
U.S. Cl. 136—86                                      7 Claims

ABSTRACT OF THE DISCLOSURE

Improvement to process for electrolytically dissociating fused alkali metal halides by adding an alkali metal to the fused halide to cause increased wetting of the carbon or graphite anodes by the fused halides. A preferred current reversal pulsing technique for introducing the alkali metal into the halide is described.

---

This invention relates generally to electrolysis of molten alkali metal halides and, more particularly, to alkali metal/alkali metal halide/halogen fuel cells of the secondary or regenerative type wherein the cell reactants are electrolytically regenerated from their electrochemical reaction product.

A problem frequently encountered in the electrolytic dissociation of a compound into its constituents, wherein one of the constituents is a gas, is the formation of a gaseous film over the surface of the gas electrode. This gas film effectively limits the current density above which no further electrolytic dissociation can occur. It therefore polarizes the particular electrode. This film formation, which is designated herein as the anode effect, is particularly objectionable in fuel cells of the secondary type wherein the electrolyte is electrolytically dissociated in situ to regenerate the cell's reactants while the cell is being recharged. It is disadvantageous because it limits the charging current density or charging rate. As a practical matter, it is desirable to have a cell which can be recharged at least 4 times the maximum discharge rate. Such a recharge rate permits relatively short recharge waiting periods. By reducing recharge "down time," greater utilization of the cell is achieved.

By my invention I have eliminated the polarizing gas film on the surface of the gas electrode during the electrolytic dissociation of an electrolyte to provide significantly increased charging rates.

It is, therefore, an object of my invention to increase the charging rate of secondary type alkali metal/halide/halogen fuel cells by eliminating the polarizing gas film formed on the surface of the gas electrode.

It is another object of my invention to provide a process for recharging a secondary alkali metal/halide/halogen fuel cell by adding a solute to the halide electrolyte that increases the wetting affinity of the electrolyte for the gas electrode whereby increased charging rates may be impressed upon the cell.

It is a further object of my invention to increase the electrolyzing current density of an alkali metal halide electrolysis cell having carbon anodes by periodically forming an anode effect suppressant in the cell itself during electrolysis.

These and other objects of my invention will become apparent from the detailed description which follows.

Briefly stated, my invention comprises electrolyzing a fused alkali metal halide in an electrolytic cell (e.g., a secondary type fuel cell), employing carbon or graphite anodes, which are not substantially wet by the fused halide, by additionally introducing free alkali metal into the electrolyte. Some free alkali metal is always present in the electrolyte owing to its dissolution from the cathode onto which it is normally plated. By my invention I supplement the amount already present. The thus introduced alkali metal is effective in increasing the limiting current density associated with the polarization of the electrode incident to the formation of an electrochemical reaction impeding gas film over its surface.

More specifically, my invention relates to an alkali metal/halide/halogen (e.g., $Li/LiCl/Cl_2$) fuel cell wherein the halide electrolyte is electrolytically dissociated in situ in order to recharge the fuel cell. In this connection I have found that I can increase the charging limiting current density by plating small but effective amounts of alkali metal onto the graphite gas electrode. While it is not known exactly what function this plating performs, two distinct changes occur in the cell during the subsequent passing of charging current which effects the electrolytic dissociation of the electrolyte. First, the lithium plate disappears and second, the surface of the carbon electrode is eroded with an attendant formation of lithium carbide. The roughened surface, of course, increases the effective surface area of the electrode. The lithium carbide or lithium, apparently dissolves in the electrolyte, increasing the electrolyte's wetting affinity for the graphite gas electrode (i.e., causes increased wetting of the carbon or graphite by the electrolyte). This increased wetting of the graphite by the electrolyte evidently resists the tendency for an insulating gas film to form and therefore raises the limiting charging current density.

It has been found that the introduction of lithium into the LiCl electrolyte will raise the critical charging current density of any carbon electrode placed in the electrolyte. This is true whether or not the lithium has been introduced by plating onto one particular electrode or onto any other electrode collocated in the same electrolyte. Hence, for example, a plurality of graphite electrodes were placed in a lithium chloride electrolyte, but with only one of the electrodes having the lithium plated on its surface. By plating the lithium on only one electrode and observing the limiting charging current densities of all the electrodes, it was observed that all the electrodes experienced increased wetting by the electrolyte and correspondingly higher limiting current densities. Under these conditions, electrodes, which before the deposition of lithium had limiting current densities ranging from 0.4–2.0 amps per square centimeter (a./cm.$^2$) subsequently exhibited limiting current densities of up to 15 a./cm.$^2$ after the deposition of lithium. It was also noted that the effects of a single deposition of lithium was effective for several minutes before the limiting current density began to gradually fall off to an undesirable low level. It was concluded that the solute was reacting with the $Cl_2$ and hence being removed from the system is such a manner as to reduce the wetting affinity of the electrolyte for the graphite.

Appreciating that the effect of a single deposition of lithium would not last for any extended time period, provision was made for the formation of more solute by a further deposition of lithium onto the graphite electrode. I found that by appropriately interrupting the charging current with a periodic reverse current pulse, high recharge rates could be sustained. In this connection, I prefer to use a high speed switch powered by a pulse generator to reverse the current for appropriate small time intervals during continuous charge. For example, when charging at a level of 12 a./cm.$^2$, it appears that for a cell employing a porous FC-11 graphite electrode in 154 grams of molten LiCl electrolyte, a period comprising 98 milliseconds (1.176 coulombs/cm.$^2$) of continuous charge and a reverse pulse in the order of 2 milliseconds (0.024 coulombs/cm.$^2$) impressed upon the system is adequate to plate sufficient lithium on the electrode. Hence, when charging at a current density of 12 a./cm.$^2$, a two milliseconds reverse pulse of the same magnitude (−12 a./cm.$^2$) deposits sufficient lithium (0.00168 mg./cm.$^2$) to maintain the charging level. This comprises a 2% duty cycle. The duty cycle then is the ratio of the duration of the pulse to the charge period which is the sum of the reverse pulse duration and the forward charge duration. Obviously, a similar amount of lithium could be deposited at lower current densities if the duration of the pulse were longer. Ideally, in terms of recharge time, short infrequent pulses of high magnitude are preferred. Hence, the smallest duty cycle in combination with the longest period is preferred. Similarly, a ratio of the coulombs on reverse pulse to those on continuous charge which approaches zero would be the ideal pulsing arrangement. As a practical matter for a Li/LiCl/Cl$_2$ cell, this ratio may conveniently be from 0.01–0.1. However, though operative, once the duty cycle or for that matter the ratio of the coulombs on reverse pulse to those on continuous charge exceeds 50% or 0.5, it becomes impractical to use the method of my invention because much of the time and current is lost in the solute forming pulse. In any event, the exact magnitude/period/duty cycle combination will vary from cell to cell depending on the type of graphite and the volume of electrolyte to be used as the solvent. The volume of the electrolyte determines how much solute that must be formed to effect a given concentration which, of course, is directly related to the wetting improvement. However, when frequent pulses are employed the volume of LiCl is less significant because the solute will not have sufficient time to migrate appreciably away from the electrode. The effect of this is such that the concentration of the solute in the region about the electrode enhances the wetting affinity of that portion of the electrolyte for the carbon electrode. It is obvious, therefore, that each individual cell should be adjusted experimentally to determine its optimum combination of charging current magnitude, charging period and duty cycle.

I have noted also that the reversed current pulse requirements reduce with time. This is explained by the fact that there is a cumulative benefit in terms of a buildup of solute in the electrolyte after the cell has been charging for a while at an initial reverse current cycle. This is so to the extent that I have noted that at times no reverse pulse at all was needed to maintain high levels of charging current densities for time periods in excess of 10 minutes. In this connection, see Table I. Hence, after the cell has been under charge conditions for a while using the reverse current pulsing of my invention, both the magnitude and duration of the pulses may be reduced to a low level which level need only supply the additional solute lost from the electrolyte. In effect, then, equilibrium can be established between the solute loss and the solute replenishment.

TABLE 1

| Reverse pulse current, amp/cm.$^2$ | Li plated per pulse, mg./cm.$^2$ | Steady state charge rate, amp/cm.$^2$ |
|---|---|---|
| Time: | | |
| 0 | 0 | 0.4 |
| 1.0 | 7×10$^{-4}$ | 1.0 |
| 2.5 | 17.5×10$^{-4}$ | 2.5 |
| 7.0 | 49×10$^{-4}$ | 6.0 |
| 5.0 | 35×10$^{-4}$ | 7.0 |
| 0 | 0 | 15 |

Table 1 is a sample of one test conducted which employed a 10 milliseconds pulse after each 90 milliseconds continuous charge (10% duty cycle for a 100 milliseconds period). In this test a cell containing 154 grams of LiCl was used. The cell was charged for three minutes at 1.0 amp/cm.$^2$, two minutes at 2.5 amps/cm.$^2$, two minutes at 7.0 amps/cm.$^2$, and two minutes at 5.0 amps/cm.$^2$, after which it was observed that for 10 minutes no additional pulsing was required in order to maintain the 15 a./cm.$^2$ continuous charging level.

Obviously, the principles discussed here with respect to my specific example which relates solely to recharging a fused alkali metal/halide/halogen fuel cell will be applicable to the electrolytic production of Li, Na or K from their fused salts as well.

While I have disclosed my invention solely in terms of one embodiment thereof, I do not intend to be limited thereto, except as by the appended claims.

I claim:
1. In a process for the electrochemical dissociation of a fused alkali metal halide in an electrochemical cell having a cathode and at least one carbon or graphite anode and including the principal step of impressing electrolyzing current on said anode and said cathode, the improvement comprising impressing said current intermittently in reverse pulses of such magnitude and duration as to plate a sufficient amount of free alkali metal onto said anode to increase the electrolyzing current densities which may be impressed upon the cell before anode polarizing gas films are formed.
2. A process as claimed in claim 1 wherein said electrochemical cell is a secondary type fuel cell which is being charged.
3. A process as claimed in claim 2 wherein said alkali metal halide is lithium chloride.
4. A process as claimed in claim 3, wherein the magnitude of said impressing current is from small but effective amounts to about 15 a./cm.$^2$ of electrode surface.
5. The process as claimed 3 wherein said electrolyzing current has a duty cycle equal to the ratio of the duration of the pulse reverse to the duration of the total charging period which is less than 0.5.
6. A process as claimed in claim 5 wherein said period is at least 100 milliseconds.
7. The process as claimed in claim 3 wherein the ratio of the coulombs delivered during the reverse current pulses to the remaining coulombs delivered is about 0.01–0.10.

References Cited

UNITED STATES PATENTS 2,451,341  10/1948  Jernstedt _____ 204—228X

JOHN H. MACK, Primary Examiner

D. R. VALENTINE, Assistant Examiner

U.S. Cl. X.R.

204—68, 228

PO-1050
(5/69)

UNITED STATES PATENT OFFICE
CERTIFICATE OF CORRECTION

Patent No. 3,560,263        Dated  February 2, 1971

Inventor(s)  Dominicus A.J. Swinkels

It is certified that error appears in the above-identified patent and that said Letters Patent are hereby corrected as shown below:

Column 3, line 61, in the second occurrence, "," should read -- . --.

Column 4, Claim 5, line 50, after "claimed" insert -- in claim --;  Claim 5, line 52, "pulse reverse" should read -- reverse pulse --.

Signed and sealed this 16th day of November 1971.

(SEAL)
Attest:

EDWARD M. FLETCHER, JR.        ROBERT GOTTSCHALK
Attesting Officer              Acting Commissioner of Pa